UNITED STATES PATENT OFFICE.

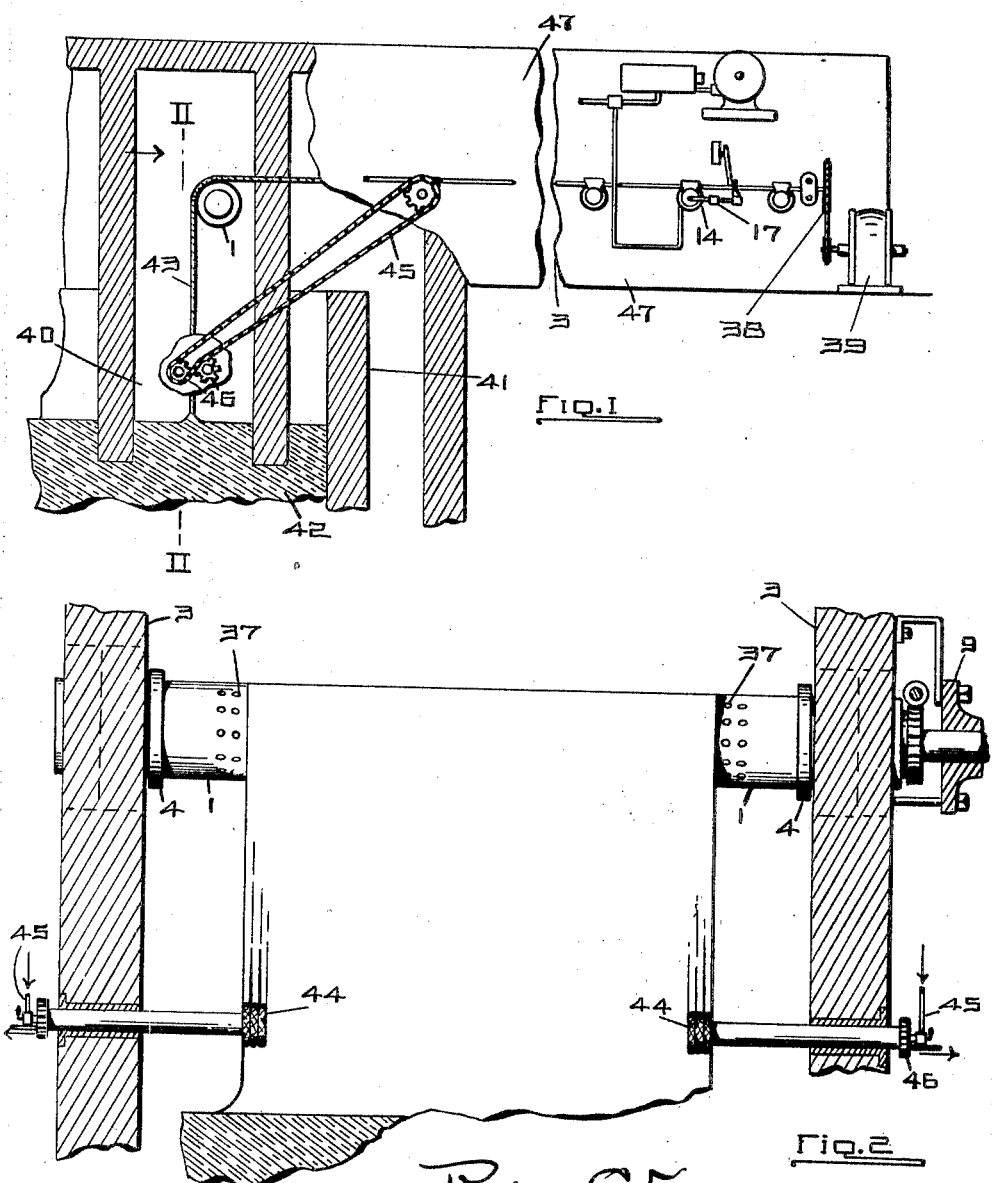

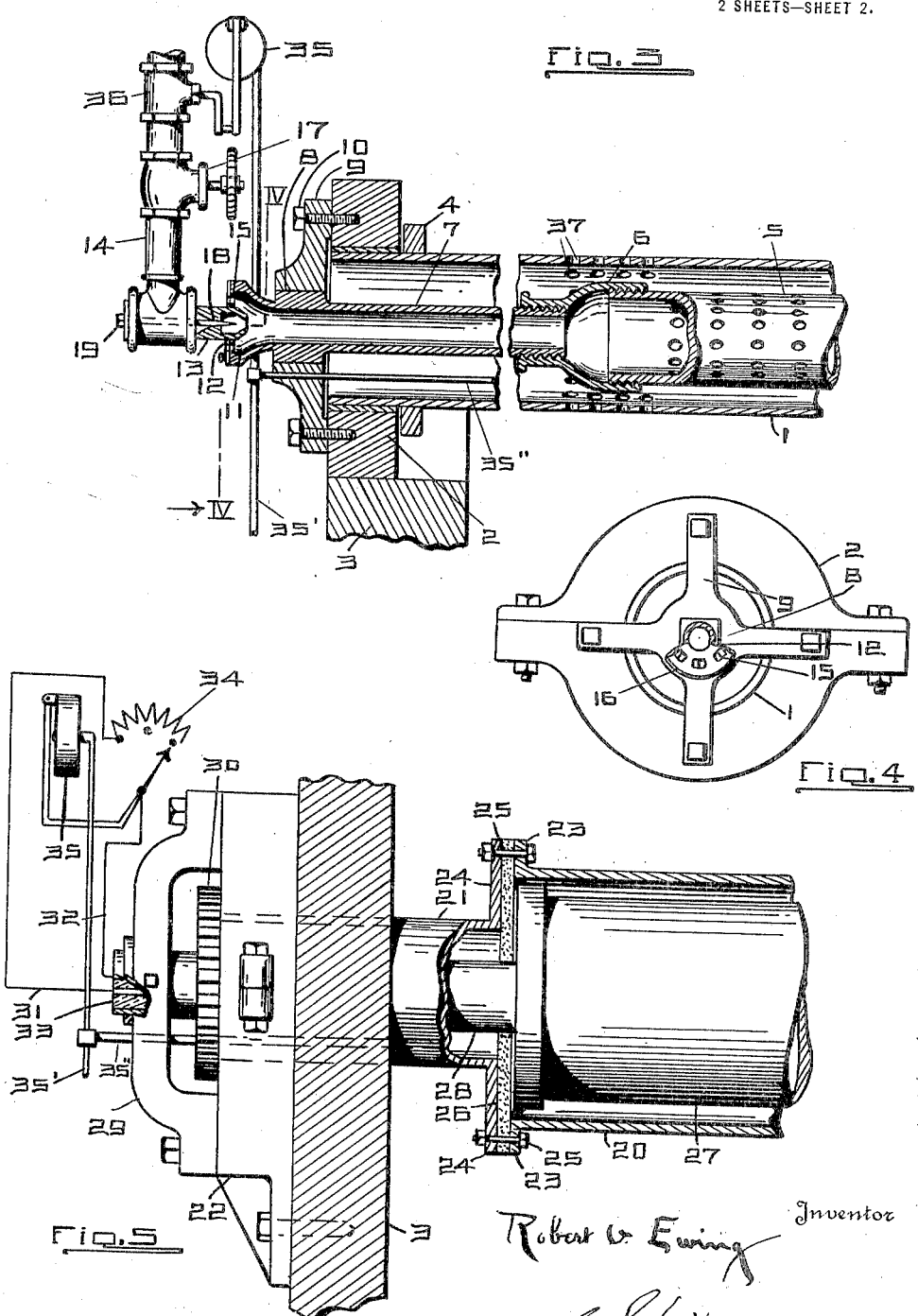

ROBERT G. EWING, OF TOLEDO, OHIO.

SHEET-GLASS-DRAWING APPARATUS.

1,399,547.   Specification of Letters Patent.   Patented Dec. 6, 1921.

Application filed August 1, 1919. Serial No. 314,626.

*To all whom it may concern:*

Be it known that I, ROBERT G. EWING, a subject of the King of Great Britain, residing at Toledo, Lucas county, Ohio, have invented new and useful Sheet-Glass-Drawing Apparatus, of which the following is a specification.

This invention relates to the manufacture of sheet glass, and more particularly to the continuous drawing thereof from a pool of molten glass and from thence to pass over a bending roll.

This invention has utility when incorporated in apparatus for the manufacture of sheet glass, especially in connection with rolls used for lifting, drawing, carrying, directing, or surface finishing sheet glass, and the provision of devices for so handling the glass that the surface thereof may not be chilled nor the glass be clouded.

Sheet glass as drawn from a molten pool has a clear fire finish. To avoid chilling, clouding, or dulling effects on such highly finished glass surface, even after passing rolls, is attained by the invention herein.

Glass, when in a welding molten state readily adheres to metal, as iron, when such iron is heated to redness. This welding of glass to hot metal is utilized in drawing glass, wherein a metal "bait" is heated, dipped into the molten glass to weld therewith, and then on removal therefrom, may draw a sheet (if the "bait" be flat) from the molten glass pool. In drawing glass, the portion handled rapidly changes in character from the molten state to a plastic, semi-plastic, pliable without plasticity, soft vitreous and hard vitreous states or conditions in this order. In these latter conditions there is no tendency of the glass to adhere to metal of equal nor even of greater temperature unless the glass remains in contact therewith a sufficient time to soften.

Herein it is contemplated to use rolls on the glass sheet in the continuous manufacture of sheet glass when the glass is in a semi-plastic state, as in smoothing the surface thereof; or in a pliable or bending condition, as for changing the direction of sheet travel, say from vertical to horizontal, or vice versa; or in the treatment or handling in the leer. The feature of the rolls is that they shall be brought substantially to the temperature of the glass at the point of engagement of the glass by the roll.

In accordance with the invention herein, this approximation of the temperature of the glass by the contacting roll is usually obtained by heating such roll. Chilling effect of the roll on the glass is thus avoided continuously throughout the manufacture. In this simple manner, without extra treatment of the glass, the superior initial fire finish is the finish of the final product. The heat radiation rate of the roll tends to maintain the contact regions of the roll much below that of the glass, and this detrimental condition is most seriously aggravated by water circulation for cooling the roll away from an adhering temperature as to the glass. Such failure to take into account but the one condition of the glass and to meet such by getting the roll into condition to attack the glass is expensive. The waves of the bend become permanent, the surface is chilled and rendered undesirable as a transparency or smooth surface article, to cure which polishing is resorted to, and also reheating.

As an embodiment of the invention for taking into account the condition of the glass and the temperature of the glass contacting rolls, for directly producing continuously sheet glass, attention is directed to the accompanying drawings, wherein—

Figure 1 is a side elevation, with parts broken away, of a continuous sheet glass drawing apparatus;

Fig. 2 is a section on the line II—II, Fig. 1, looking in the direction of the arrow;

Fig. 3 is a fragmentary view of a temperature controlled glass contacting roll of a continuous sheet glass apparatus;

Fig. 4 is a section on the line IV—IV, Fig. 3, looking in the direction of the arrow; and Fig. 5 is a fragmentary view of a glass contacting roll of a continuous sheet glass manufacturing apparatus in which the temperature is controlled by an electric heater, instead of by a gas burner or furnace as shown in Fig. 3.

Tubular roll 1 (Fig. 3) is rotatably mounted at each end in suitable bearings 2 carried by a support or wall 3 of refractory material of the general housing of the continuous sheet glass manufacturing apparatus. A desired type of roller or ball bearings may be adopted for the roll. The roll 1 is provided with collars 4 adjacent the bearings 2 to limit endwise movement of the roll 1.

Within the bore of the roll 1, concentrically disposed longitudinally thereof is a perforated tubular heat radiating furnace member 5 of suitable relative diameter as to the roll 1. This member 5 is fixedly supported as here shown, independently of the roll 1 by reducers 6 having threaded connection with the member 5 and threaded mounting on mixer tubes 7. Squared enlargement 8 on the mixer tube 6 holds such tube from rotation as mounted in spider 9 connected by screws 10 to the bearing 2. The position of the furnace member or burner 5, with the reducers 6 and tubes 7 is thus fixed concentric of the roll 1 as a heating device.

The mixer tubes 7 have their outer ends flared, or conically enlarged to form gas mixing chambers 11, having a central opening or orifice 12 at its outer end, concentric with the tubular portion of the tubes 7. Gas supply nozzle 13 extends into the opening 12 to conduct gas into the burner or furnace as delivered by supply pipe 14. About the nozzle 13 and the opening 12 is an annular series of air feeding openings 15, the air supply through which for mixing with the gaseous fuel, may be adjusted by rotation of the perforated closure plate 16 to bring the openings of the plate 16 into or out of registry with the openings 15. Manual control of the supply of gaseous fuel to the nozzle 13 may be adjusted by valve 17, while more delicate regulation is effected by needle 18 having a squared end 19 to which a wrench may be applied in shifting the needle as to the nozzle 13. In addition to this primary supply of air for mixing with the fuel in the chamber 11, air supply to the burner or furnace may pass in the open end of the roll 1 between the arms of the spider 9. The burner details may be omitted with a direct supply of a heating medium for the roll, say by hot gases or hot air from pipe 14.

In the substitution of electric heating devices for the gaseous fuel burner, as shown in Fig. 5, roll 20 may be provided with a tubular journal 21 adapted to rotate in bearing 22 secured in the support or refractory housing wall 3. The roll 20 has a terminal annular flange 23 with perforations therein to register with perforations in annular flange 24 of the journal 21, so that bolts 25 may in assembling the journal with the roll also mount insulation or asbestos disk 26 therebetween.

Concentrically through this roller 20 extends an electric heater 27, provided at its ends with tubular end reducers 28 which extend concentrically through the journals 21 of the roll 26, and through the bearings 22 secured in the support 3, and also centrally and fixedly through spider 29 which is mounted on the bearing 22. To maintain the journal 21 against inward movement through the bearing 21, a flange 30 is provided on the journal 21 adjacent the bearing 22.

The reducers 28 supporting the heater 27 away from the roll 20, also serve as casings for insulated conductors 31, 32, which preferably extend through a porcelain core 33 embedded in the reducers 28 and which connect the heater resistance 27 to place it in circuit with a source of electricity, preferably through a control device, as a rheostat 34, which may be automatically controlled by a pyrometer device 35 in an air line 35' past pyrometer 35''.

The pyrometer device 35, instead of operating the rheostat 34, may operate a valve 36 in gas supply line 14, and thus effect an automatic temperature control operation of the gas heater or furnace for the roll 1. The products of combustion from the burner 5 in the roll 1 may pass therefrom, as by openings 37.

Thus constructed, whether the gas heated roll 1 or the electrically heated roll 20 be used in an apparatus for the continuous drawing of sheet glass as herein disclosed, the roll may be readily, and even automatically maintained at a degree of heat relative to the temperature of the glass at the point of its contacting with the roll. Under these circumstances, the surface of the glass at such point of roll contact will neither be chilled to produce permanent waves or bends of its surface, or fused to adhere to the roll. This roll, therefore, is a factor in maintaining the sheet flat. Therefore the rolls 1 or 20, will not destroy the fire finish of the glass, which the glass initially has as drawn from the molten pool or glass tank. In working hereunder for glass which would have a flattening temperature of 1200° F., it is desirable that the glass in passing over the bending roll have such comparatively low bending temperature. It will thus not tend to stick to the roll, nor tend to spontaneously crystallize forming pits, or objectionable characteristics of so called burned glass.

In the installation of the rolls hereunder with pyrometers 35'', there may be indication of temperature, instead of direct autocatic temperature control. While the rolls used may be made of any suitable metal, or alloy highly polished on its surface, or even carbon or graphite, the latter may tend to flake off and become rough or mar the glass, and it is preferred to use an alloy of nickel 65%, copper 32%, and iron 3%.

The rolls may be rotated by the action of the sheet glass being drawn thereacross or thereover, in contact with the rolls, while as shown in Fig. 3, the collar 30 may be provided with teeth, and through gearing 38 from motor 39 (Fig. 1) rolls as desired may be power actuated or positively driven and thereby travel with the passing glass in synchronism therewith and idly, or even effect more or less draw actuation for the glass.

In the disposition of the temperature control or heating means for maintaining a desired condition of the roll, instead of outside the roll, such is shown herein as being within the roll, thus making a compact and self-contained structure. In getting the apparatus of this disclosure under way, the rate of draw of the glass, together with its rate of cooling are factors, which vary for different kinds of glass, but in working to the desired conditions hereunder, the operating conditions outlined herein are quite quickly approximated and in actual practice the roll temperature is preferably above that of the passing glass. Were the glass coming over the bending roll at ten or eleven hundred degrees Fahrenheit, and the bending roll of a temperature around six hundred degrees Fahrenheit, there would be danger of the trouble which it is herein sought to avoid.

In the well 40 (Fig. 1) of a glass tank 41 is a pool of glass 42, from which sheet 43 is continuously drawn to pass vertically upward and thence horizontally over the bending roll 1. Herein the distance from the pool 42 to the roll 1 is such that the glass at the roll 1 is ready to assume a definite shape. Accordingly for desirable operation hereunder, it is in order so to handle the glass in its ascent that its width may be constant, thus contributing to uniformity of capacity in the production of a merchantable output.

As a simple and reliable means for effecting such width maintenance of the continuously drawn sheet, there is herein shown the provision, adjacent each of the two edges of the ascending sheet 43, of a pair of annularly grooved rolls 44 opposing each other as to each pair, with the edge of the sheet of glass 43 therebetween to be embraced thereby. The ribs of these rolls 44 are roughened or knurled as a slippage avoidance provision. These rolls 44 are disposed in such region as to the pool 42 that the rolls 44 may approximate but be slightly below the temperature of the passing glass and may coact with the glass at the desired width of sheet drawing. A circulation means as by water pipes 45 may definitely bring the rolls 44 to the desired temperature. Under these circumstances gearing 46 is designed to impart to the contacting portions of the rolls 44 a speed approximating that of the travel of the sheet of glass 43, the width of which is being maintained by such rolls 44. In respect to sheet glass travel, the rolls 44 are idle, and merely shape the edges of the sheet with such minimum of temperature lowering thereof that the residual heat in the interior of the sheet radiates back thereinto to permit the sheet to bend readily throughout its width in passing over the bending roll 1, while the rolls 44 in their coaction with the edges of the sheet, have succeeded in producing such a condition in the sheet that during its ascent from the pool 42 there is no inward sag of the edges, but such are maintained straight and parallel with each other in its travel into and through the leer 47.

What is claimed and it is desired to secure by Letters Patent is:

1. In the continuous drawing of sheet glass, a roll, a support for the roll as to which the roll is rotatable and over which roll a continuous sheet of glass may pass, conducting means for the glass sheet, a furnace fixedly mounted as to the support and extending longitudinally of the roll, means to supply heat to the furnace, and means to regulate the heat supply to bring the temperature of the roll toward the temperature of the glass passing thereover continuously during the passage of said glass.

2. In the continuous drawing of sheet glass, a roll, a support for the roll, conducting means for actuating a sheet of glass over the roll, a furnace disposed longitudinally in the roll, means to supply heat to the furnace, and means to regulate the heat supply to cause the temperature of the roll to approximate the temperature of the continuously traveling sheet of glass simultaneously contacting therewith.

3. In the continuous drawing of sheet glass, a bending guide, a support for the guide, conducting means for actuating a continuous sheet of glass over the guide, a furnace disposed to heat the guide, means to supply heat to the furnace, and means for regulating the heating of the guide during the travel of the continuous sheet of glass thereover.

4. Means for conducting glass to a horizontal travel direction in the continuous conforming of sheet glass, including a container for a pool of glass, a bending roll adjacent said pool, and means for approximating the temperature of the roll to the temperature of the sheet of glass passing thereover during such passage.

5. A continuous draw sheet glass apparatus comprising a container for a pool of molten glass, spaced from the pool, a roll for contacting the glass sheet from the pool, means for controlling the temperature of the roll above the temperature of the glass, and a leer for receiving the continuous sheet of glass from the roll.

6. A continuous draw sheet glass apparatus comprising a bending roll, and means in the roll for raising the temperature of the roll.

7. A continuous sheet glass drawing apparatus comprising a container for a pool of molten glass, a bending roll spaced from the pool for contacting the continuous sheet of glass as passing from the pool, means in the roll for raising the temperature of the the roll above the temperature of the glass, and a leer to which the sheet glass is conducted from the bending roll.

8. A sheet glass manufacturing apparatus comprising a container for a pool of glass, a roll for contacting the glass, means for drawing the glass sheet past the roll from the pool, and heating means for controlling the temperature of the roll.

In witness whereof I affix my signature.

ROBERT E. EWING.